May 18, 1954 — R. WRIGHT — 2,678,832
FLEXIBLE STEP FOR TRUCKS
Filed Aug. 19, 1952 — 2 Sheets-Sheet 1

INVENTOR.
Rex Wright
BY Lloyd W. Batch
ATTORNEY.

May 18, 1954 R. WRIGHT 2,678,832
FLEXIBLE STEP FOR TRUCKS
Filed Aug. 19, 1952 2 Sheets-Sheet 2
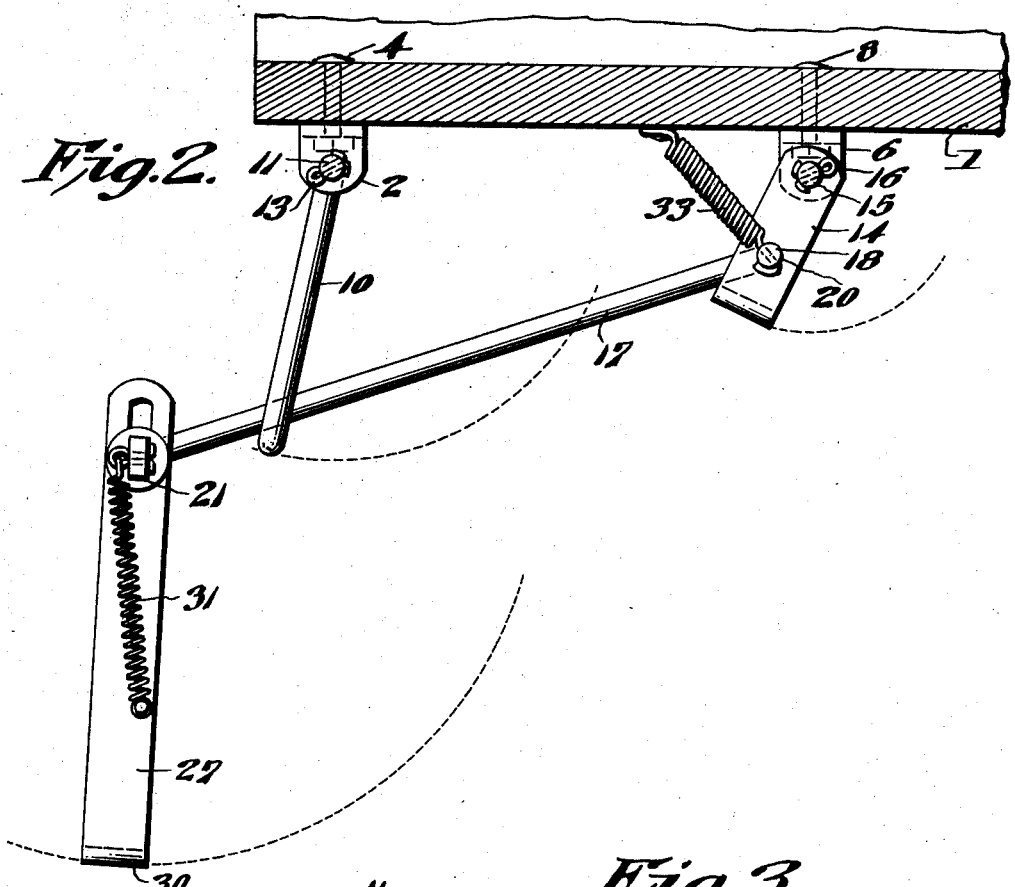
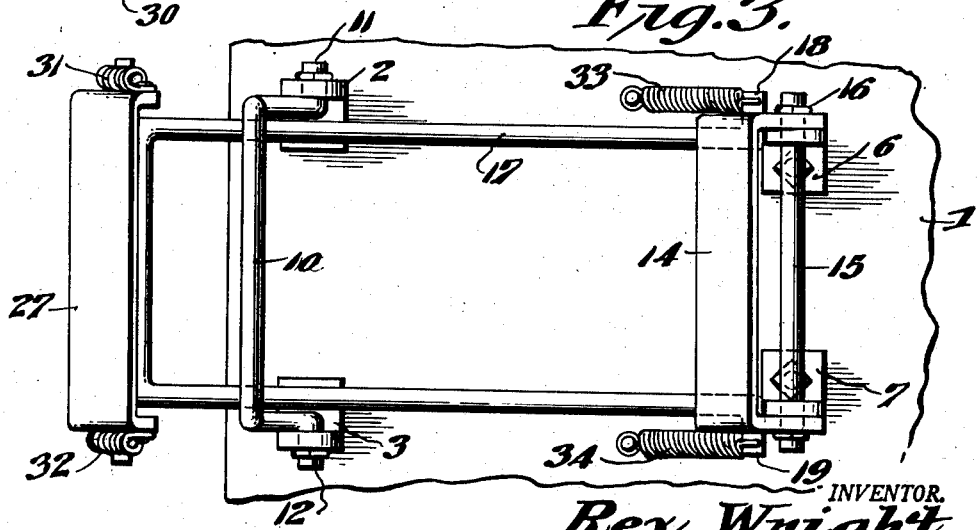
INVENTOR.
Rex Wright
BY
Lloyd W. Batch
ATTORNEY.

Patented May 18, 1954

2,678,832

UNITED STATES PATENT OFFICE 2,678,832

FLEXIBLE STEP FOR TRUCKS

Rex Wright, Guin, Ala., assignor to Gertrude Watts Sammons, Birmingham, Ala.

Application August 19, 1952, Serial No. 305,223

4 Claims. (Cl. 280—167)

My invention relates to flexible steps for trucks, and particularly to a step which can be attached permanently to the bed or floor of a truck or other vehicle, at the back and beneath the floor, to be available for use to facilitate climbing up and climbing down by a person from the truck bed or floor; and, which step is flexibly or swingably mounted so that the step will swing and push back under the truck in case it meets with an obstruction such as a loading platform, or other obstruction.

An object of this invention is to provide a step structure which can be attached or applied for use with substantially any and all truck or like vehicle structures, and which while extending and depending below the floor of the vehicle in position for convenient use, will not offer any obstructions to free and usual forward and backing or reverse travel or movement of the vehicle.

Another object is to swingably or flexibly mount the step structure so that if the step strikes or encounters any obstruction, in either forward or reverse travel of the vehicle, the step will yield and will swing up to a position adjacent to or against the lower side of the floor of the vehicle to thus clear the obstruction and prevent damage to any parts.

A further object is to so construct and assemble and mount the parts that as the weight of a person is applied to the step in use, the parts will be automatically locked and rigidly held in the desired person-supporting position, and as the user removes his foot and weight from the step, the parts will be automatically restored to the relation in which the step can swing to clear an obstruction.

Still another purpose of my invention is to so construct and associate the parts that when the weight of the user is removed from the step, the several swinging parts are free to be moved by contact with any object, and when the swinging force is removed the parts are automatically restored to position to be available to be used as a step.

With the above and other objects in view, some of which will be apparent to those skilled in the art, and others of which are inherent in the construction and assembly and use of the parts, my invention includes certain novel features of construction and combinations and arrangements and associations of various parts and portions, which will be hereinafter set forth in connection with the drawings, and then pointed out in the claims.

In the drawings:

Fig. 2 is a view in side elevation with the parts disclosed in their normal position.

Fig. 3 is a bottom plan view of the structure as shown in Fig. 2.

Figure 1:
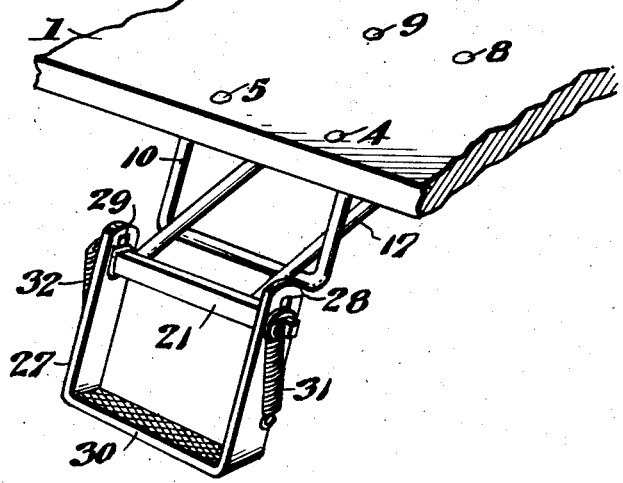
Figure 1 is a fragmentary perspective view of a portion of the rear of a vehicle bed floor showing an embodiment of my invention applied thereto.
Figure 5:
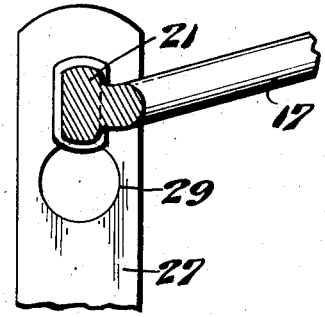
Fig. 5 is an enlarged fragmentary view, partly in section, showing the step-retaining part by which the step is held rigidly while in use.
Figure 4:
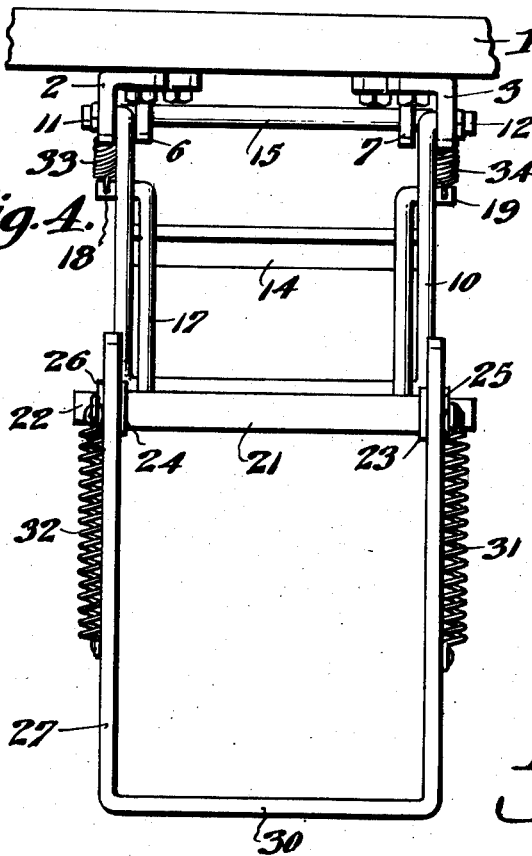
Fig. 4 is an end elevation looking from the rear.
Figure 6:
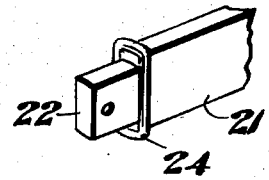
Fig. 6 is an enlarged fragmentary view of one end of the step member.
Figure 7:
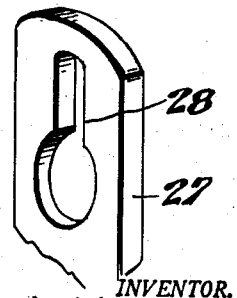
Fig. 7 is an enlarged fragmentary view of one end of the step supporting cross bar.

The flexible step of my present invention is suitable and is well adapted for attachment to and use upon various types of trucks and vehicles where it is desirable to provide a step for facilitating the climbing up and climbing down by persons from a truck bed or floor or from portions of a vehicle, and at the same time it is necessary or desirable that the step be flexibly mounted so that it pushes back under the bed or floor in case it meets with an obstruction such as a loading platform, when the vehicle is being backed, and the step also swings freely at all times when not in use and when running over an obstruction going forward so that the step will swing up out of the way on its own motion.

In the presently illustrated embodiment, an adaptation of my invention is shown as mounted on the under side of the bed or floor 1 of a truck or vehicle. In the presently illustrated embodiment, the step is shown as attached to the bed or floor by use of bolts or similar fastenings, although as the description progresses it will be seen that the step can be made to be directly applied to or can be welded or otherwise secured upon a frame or other portions of the particular truck or vehicle on which the step is mounted and used.

With the presently illustrated embodiment of my invention, a pair of substantially L-shaped mounting bearing brackets 2 and 3 are secured in spaced-apart opposed relation near the rear edge of the vehicle bed or floor, by means of bolts 4 and 5, or other suitable fastenings passing through or secured to the bed or floor. These bearing members or brackets have bearing openings therethrough aligned transversely.

A second pair of bearing brackets 6 and 7 has the members thereof mounted on the lower side of the bed or floor inwardly from the first pair of mounting brackets, this second pair of mounting brackets being possibly also of substantially L-shaped form, and being secured by means of securing bolts 8 and 9, or other suitable fastenings. The second pair of bearing brackets has aligned bearing openings therethrough, and it is perhaps preferable that the bearing brackets 6 and 7 be spaced apart a distance slightly less than the distance between the mounting brackets 2 and 3.

A U-shaped supporting loop 10, and metal rod or other suitable material, has its ends 11 and 12 bent or extending outwardly as bearings, received in the bearing openings of the mounting bearing brackets 2 and 3. Cotter pins or other suitable fastenings 13 are provided to retain the bearing ends 11 and 12 in place in the bearing openings of the mounting bearing brackets 2 and 3.

A substantially U-shaped mounting loop 14, of strap metal or other suitable material, has bearing openings through the ends thereof, and a mounting shaft 15 extends through the bearing openings of the mounting loop 14 and through the bearing openings of the mounting bearing brackets 6 and 7 so that this U-shaped mounting loop is swingably mounted between the brackets 6 and 7 with the loop thereof depending downwardly. Cotter pins 16, or other suitable fastenings, can be fitted through suitable openings in the mounting shaft 15 to secure this mounting shaft against casual or accidental displacement.

This U-shaped mounting loop 14 has bearing openings formed through the side arms thereof, in alignment, and spaced away from the bearing openings receiving the mounting shaft 15. A substantially U-shaped step-supporting member 17 has the ends 18 and 19 thereof bent or extending outwardly in position of outwardly disposed bearing portions, and these bearing portions 18 and 19 are fitted through the bearing openings 20 formed in the side bars of the U-shaped step-supporting member 17, cotter pins or other suitable fastenings being provided to retain the bearing ends 18 and 19 in place.

The U-shaped step-supporting member 17 is made with the side bars thereof sufficiently long that the looped portion of the supporting member is received through and is swingable between the side arms of the U-shaped supporting loop 10, and this U-shaped step-supporting member 17 has a flat step-supporting cross bar 21 welded or otherwise secured in place thereon with the ends extending as at 22. Collars or flanges are provided at 23 and 24, on the extending ends of the step-supporting cross bar, inwardly from the extremities, and cotter pins or other stops 25 and 26 are provided adjacent to the extremities of the flat step-supporting cross bar and are consequently spaced somewhat from the collars 23 and 24.

A substantially U-shaped step member 27, possibly made of heavier strap metal, has substantially keyhole-shaped openings 28 and 29 formed in aligned relation to the end of the arms thereof.

The cross bar or step portion 30 of the U-shaped step member 27 is made of sufficient width to give a secure and comfortable step or rest portion for the foot of the user, and this cross bar portion 30 can be roughened or otherwise treated on its upper surface to give a non-skid step portion.

Coiled springs 31 and 32 are connected with the side arms of the U-shaped step member 27, and with the extending ends 22 of the step-supporting cross bar 21, so that the U-shaped step member 27 is normally raised to have the extending ends 22 in the larger end of the keyhole-shaped openings 28 and 29, so that the U-shaped step member is free to swing or rotate or oscillate on the extending ends 22. However, with the keyhole-shaped openings 28 and 29 having the narrower and slot-like portions thereof disposed upwardly, when the weight of a person is placed on the cross bar portion 30, the entire U-shaped member 27 will be pressed down against the resilient force exerted by the coiled springs 31 and 32, and consequently the ends 22 of the flat step-supporting cross bar 21 will be received in these narrower portions of the keyhole-shaped openings 28 and 29, and the U-shaped step member 27 will be positively locked and will be held against the swinging or oscillating movement. At the same time, the weight of the user on the cross bar portion 30 will cause the U-shaped step-supporting member 17 to be swung downwardly at its outer end to rest upon the cross bar of the U-shaped supporting loop 10, and in consequence the step member and the cross bar thereof will be presented in convenient position to support the weight of a person climbing into or climbing out of the bed or body of the truck or other vehicle, or while the person is standing upon the step portion and is riding. When the weight is removed from the cross bar portion 30, the coiled springs 31 and 32 will automatically move the U-shaped step member upwardly to locate the larger portion of the keyhole-shaped openings 28 and 29 around the extending ends 22 of the flat step-supporting cross bar 21, and consequently the U-shaped step member 27 can be freely swung forwardly and backwardly if this member strikes an obstruction or meets other force.

Coiled springs 33 and 34 connected with the swinging portion of the U-shaped mounting loop 14 extend angularly rearwardly and are then connected with the bed or floor in such relation that this U-shaped mounting loop 14 will be normally moved past a dead center and will thus serve as a substantially rigid bearing mounting for the U-shaped step-supporting member 17. However, when my improved flexible step structure is installed in place upon a truck or other vehicle and the vehicle is being backed, this U-shaped supporting loop 10 will be swung back against the resilient force exerted by the coiled springs 33 and 34, and the entire step structure will be permitted to flex and resiliently move back in case the step meets with an obstruction, such as a loading platform, when the vehicle is being backed. Of course, the U-shaped step member 27 is normally free to swing in both forward and back directions, and the U-shaped supporting member 17 is free to swing up, while the U-shaped supporting loop 10 is also free to be swung in either forward or backward direction, upon meeting with any obstruction or force.

Although I have herein shown and described my improved flexible step for trucks as being applied or mounted in place by means of bolts, or similar fastenings, it will of course be understood that my improved step can be directly applied to the frame or other portions, or that attachment can be made in such a way that the parts can be welded onto a frame or other portion.

From the foregoing, it will be seen that I have provided a flexible step for trucks and other vehicles, which can be attached permanently or temporarily to the bed or floor of a truck, or can be constructed as a part of the truck, for the purpose of facilitating the climbing up and climbing down by persons from the truck bed; and which step is made rigid by the weight of a person stepping on the same so that the step will not swing or flex or move when in use. Also, it will be seen that the step, on contact, pushes back under the truck in case it meets with an obstruction such as a loading platform, and that the step also swings freely at all times when not in use and when running over an obstruction going forwardly or rearwardly so that the step swings up out of the way and prevents accidents by damage.

While I have herein shown and described only certain specific embodiments of my invention, and have suggested only certain possible modifications, it will be appreciated that many changes and variations can be made in the form and construction and assembly of the parts, and in the mounting and manner of use, without departing from the spirit and scope of my invention.

I claim:

1. A flexible step for trucks and like vehicles comprising a substantially U-shaped supporting loop swingably mounted beneath the floor of the vehicle near the rear end thereof, a substantially U-shaped mounting loop swingably mounted on the vehicle forwardly of the supporting loop, a substantially U-shaped step-supporting member swingably mounted at its ends on the U-shaped mounting loop and with the cross bar portion thereof swingably received within the loop of the supporting loop, and a substantially U-shaped step member carried by and depending from the looped portion of the U-shaped step-supporting member.

2. A flexible step for trucks and like vehicles to be mounted at the back of the floor of the body comprising a substantially U-shaped supporting loop swingably mounted on the lower side of the floor adjacent to the rear end, a substantially U-shaped mounting loop swingably mounted on the lower side of the floor forwardly and in spaced relation from the mounting of the U-shaped supporting loop, a substantially U-shaped step-supporting member having its ends swingably connected with the side bars of the U-shaped mounting loop and having its looped portion swingably received between the side bars of the supporting loop, a step-supporting cross bar carried at the looped portion of the U-shaped step-supporting member and having extending ends, a substantially U-shaped step member having bearing openings at its ends receiving the extending ends of the flat step-supporting cross bar, and springs connected with the U-shaped mounting loop and with the vehicle floor rearwardly of the swingable mounting of said U-shaped mounting loop.

3. A flexible step for trucks and vehicles to be mounted beneath the floor of the vehicle near the rear thereof comprising, a substantially U-shaped supporting loop swingably mounted at its ends on the lower side of the floor adjacent to the rear thereof with the loop depending, a substantially U-shaped mounting loop swingably mounted at the ends of its arms on the lower side of the floor forwardly from the mounting of the U-shaped supporting loop, a substantially U-shaped step-supporting member swingably mounted at the ends of its arms on the arms of said U-shaped mounting loop and having the closed end thereof swingably received within the loop of the U-shaped supporting loop member, a substantially flat supporting cross bar carried by the looped portion of the U-shaped step-supporting member and having extending ends, a substantially U-shaped step member having keyhole-shaped openings at the ends of its arms receiving the flat extending ends of the step-supporting cross bar and having the smaller part of the keyhole-shaped openings disposed upwardly, and springs urging said U-shaped step member normally upwardly so that the extending ends are within the larger portions of the keyhole-shaped openings to thus swingably mount the U-shaped step member.

4. A flexible step for trucks and other vehicles to be mounted below the floor of the vehicle at the rear thereof comprising a substantially U-shaped supporting loop swingably mounted by the ends of its arms adjacent to the rear and beneath the floor with the looped portion freely swingable, a substantially U-shaped mounting loop swingably mounted at the ends of its arms on the lower side of the floor in front of and spaced forwardly from the U-shaped supporting loop, said U-shaped mounting loop having bearing openings through the side arms thereof spaced from the swinging mounting, a substantially U-shaped step-supporting member having its ends swingably mounted in the bearing openings of the U-shaped mounting loop and having its looped portion extending through and swingable within the looped portion of the U-shaped supporting loop member, a step-supporting cross bar carried by the looped end of the U-shaped step-supporting member and having substantially flattened extending ends, a U-shaped step member having substantially keyhole-shaped openings at the ends of the arms thereof receiving the substantially flat extending ends, said keyhole-shaped openings having the smaller ends thereof disposed upwardly, springs normally urging said U-shaped step member to a position with the flattened extending ends in the larger portions of the keyhole-shaped openings, and spring means normally resiliently urging said U-shaped mounting loop to swing toward the U-shaped supporting loop.

References Cited in the file of this patent

UNITED STATES PATENTS

| Number | Name | Date |
| --- | --- | --- |
| 868,352 | Marr | Oct. 15, 1907 |
| 2,487,921 | Culver | Nov. 15, 1949 |